C. O. CROSBY.

3 Sheets—Sheet 1.

Sewing Machine.

No. 4,305.

Reissued March 21, 1871.

N. PETERS, Photo-Lithographer, Washington, D. C.

3 Sheets—Sheet 2.

C. O. CROSBY.

Sewing Machine.

No. 4,305.

Reissued March 21, 1871.

INVENTOR
Chauncey O. Crosby
By his attorney
John E. Earle

WITNESSES
J. H. Shumway
A. J. Tibbits

N. PETERS. Photo-Lithographer, Washington, D. C.

3 Sheets—Sheet 3.
C. O. CROSBY.
Sewing Machine.
No. 4,305.
Reissued March 21, 1871.
Fig. 3
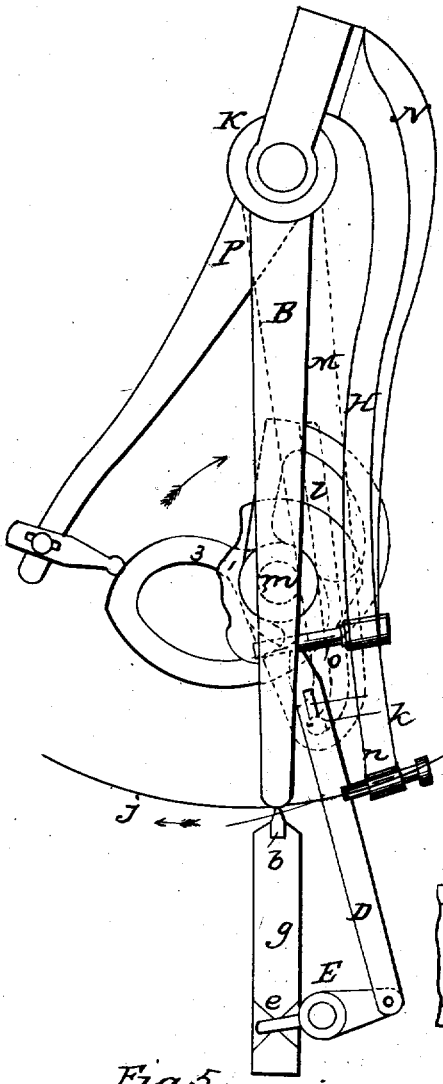
Fig. 6
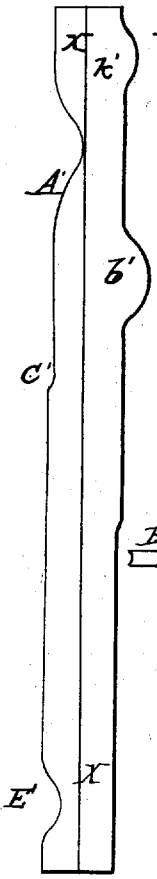
Fig. 8.
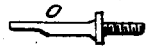
Fig. 9.
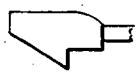
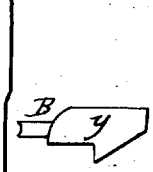
Fig. 4
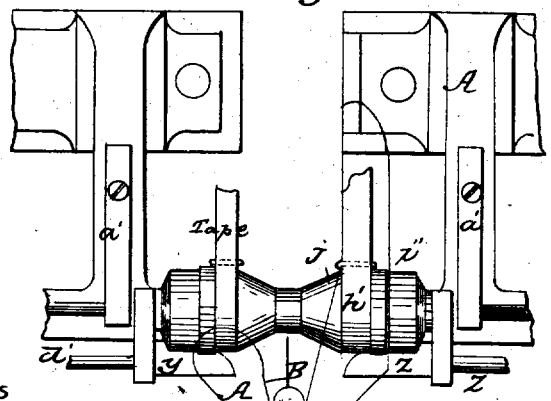
Fig. 5
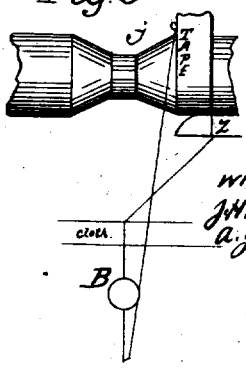
WITNESSES
J. H. Shumway
A. J. Libbits
INVENTOR
Shumway & Crosby
by his Atty.
John E. Earle
N. PETERS. Photo-Lithographer. Washington, D. C.

UNITED STATES PATENT OFFICE.

CHAUNCEY O. CROSBY, OF NEW HAVEN, ASSIGNOR TO N. A. BALDWIN, OF MILFORD, CONNECTICUT.

IMPROVEMENT IN SEWING-MACHINES.

*Specification forming part of Letters Patent No.* 21,745, *dated October* 12, 1858; *reissue No.* 4,305, *dated March* 21, 1871.

*To all whom it may concern:*

Be it known that I, CHAUNCEY O. CROSBY, of New Haven, in the county of New Haven and State of Connecticut, invented a new Improvement in Sewing-Machines; and I do hereby declare the following, when taken in connection with the accompanying drawings and the letters of reference marked thereon, to be a full, clear, and exact description of the same, and which said drawings constitute part of this specification, and represent, in—

Figure 1:
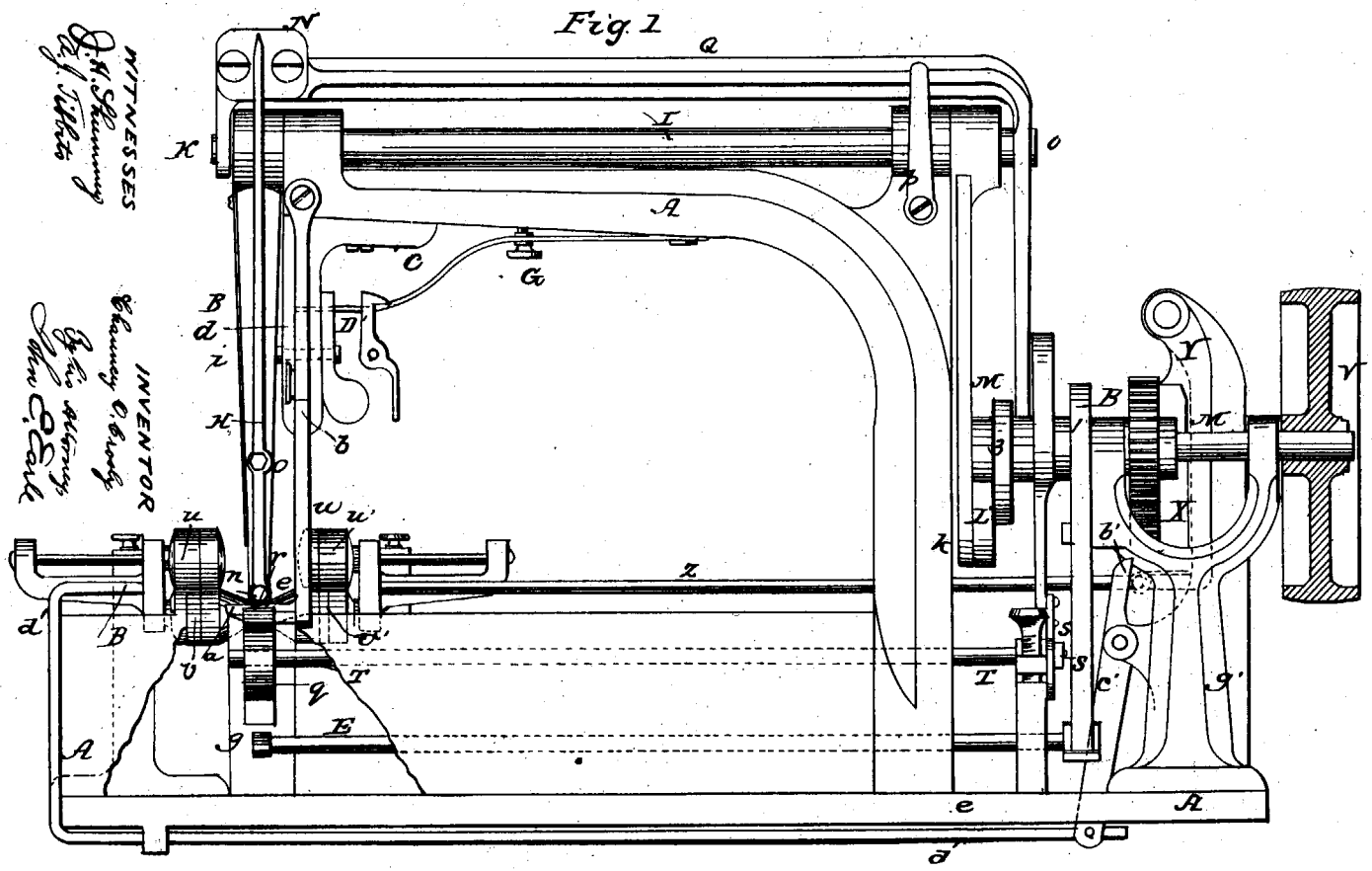
Figure 2:
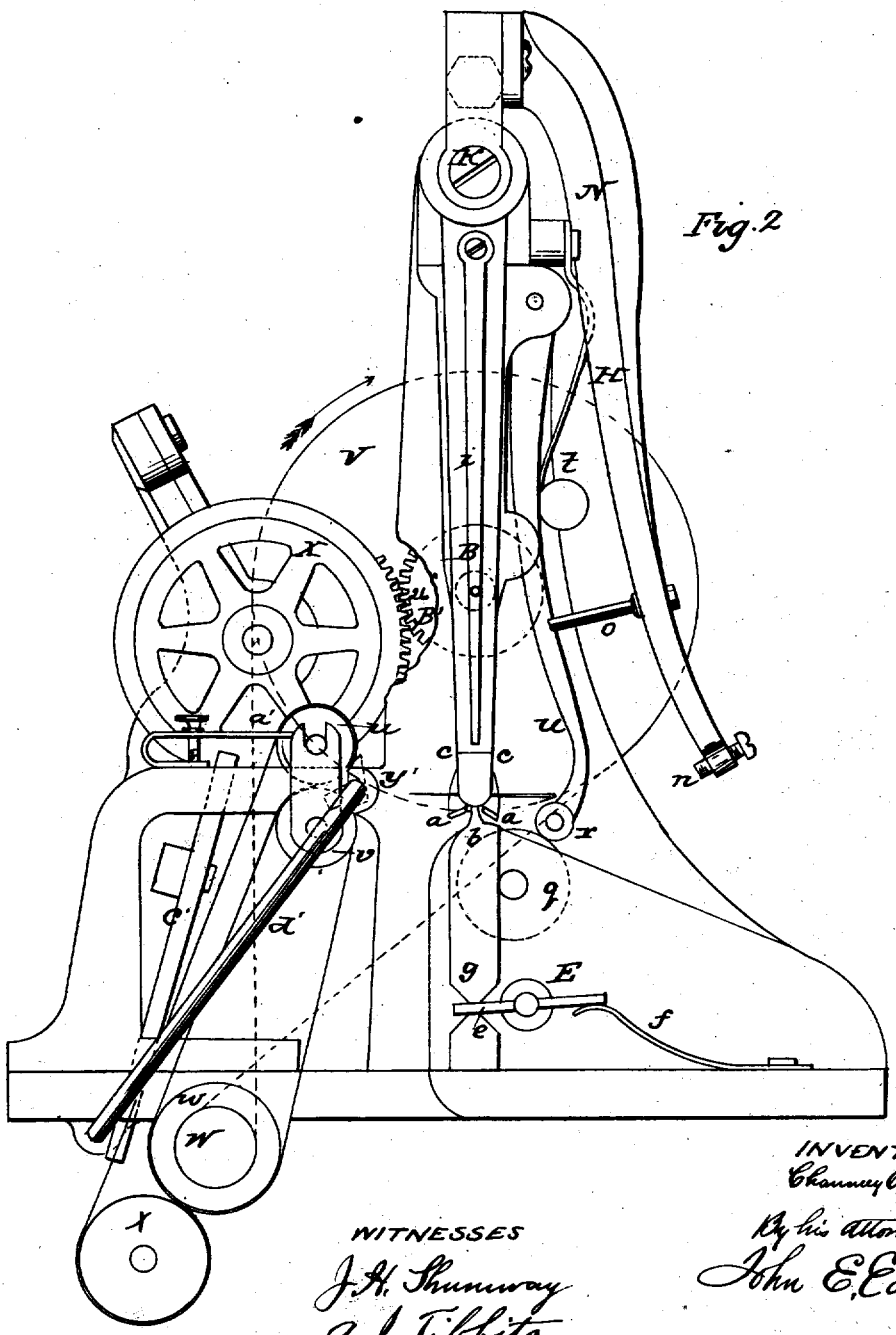

Figure 1, a vertical plan of the whole machine, as viewed from the right-hand side; Fig. 2, a vertical plan of the same, viewed from the front end, showing the needle-bar, thimble-bar, the tape-pulleys with the endless tapes, the gear-wheels, &c.; Fig. 3, a vertical plan of the same, viewed from the front end, showing the cams, levers, &c.; Fig. 4, a bird's-eye view of a portion of the same, showing the relative position of the tape-pulleys, needle-bar, with needle, position of the cloth, &c., during the backward movement of the needle-bar; Fig. 5, a bird's-eye view of a portion of Fig. 4, showing the positions in the forward movement of the needle-bar; Fig. 6, a view of the cam-wheel displayed as a horizontal plane, showing the cams on each side; Fig. 8, a plan of the bar which passes through the needle-bar to release the needle; Fig. 9, a plan of the hooks which carry the loop of the slack thread to the endless tapes.

My invention consists in so constructing the machine that, by the arrangement and combination of the several devices, I am enabled to imitate (so far as is beneficial) the manipulations of sewing by hand, so far as the thumb and the first two fingers of the left hand are used in holding the cloth and those of the right hand in using the needle, as I use but one common sewing-needle and but one thread, as in sewing by hand.

Also, in the method, hereinafter described, of drawing the main portion of the thread through the cloth, controlling the slack thread and drawing up the stitch without any strain upon the eye of the needle or of the thread where it rests in the eye of the needle, or of chafing the thread by drawing it through at an acute angle with the cloth, each of which evils occurs in sewing by hand.

I make the frame A, &c., of cast-iron or any other suitable material, substantially in the form shown in Fig. 1, or any other convenient form.

I make the cloth-holder of a pair of spring-jaws or clamps, *a a*, as represented in longitudinal plan in Fig. 1, in cross-section in Fig. 2, and in bird's-eye view in Fig. 4, which represent the thumb and middle finger of the left hand. The jaws are sustained by a split bar, (whose parts serve as springs,) as indicated at *c*, Fig. 1, and at *c c*, Fig. 2.

I suspend this split bar (and of course the jaws) by a pin in a slot in the bar, as at *d*, Fig. 1, and I press it down by a spring, C, Fig. 1, so that the jaws will conform to any thickness of cloth; and they may be held down by a hook, as shown at D′, or the spring may be adjusted by a thumb-screw, as at G, Fig. 1; but neither of these is very material. I have a tongue or piece, as shown at *b*, Fig. 3, which passes up between the jaws *a a*, as seen in Fig. 2, to force up the bight or bend of the cloth, as signified in Fig. 4, to allow the needle to pass through it. This tongue represents the fore finger of the left hand in sewing.

This tongue is fitted into the upper end of the frame *g*, Figs. 1, 2, and 3, to render it susceptible of being changed to suit the thickness of the cloth, as thicker cloth will require a thicker tongue to prevent bending it too short. This frame *g* is elevated by the operation of the cam No. 1, Figs. 1 and 3, through the medium of the bar D, Figs. 1 and 3, rock-shaft E, Figs. 1, 2, and 3, and lever *e*, Figs. 2 and 3, and it is depressed by the spring *f*, Fig. 2, acting on the end of the lever *e*.

Across the center of these jaws *a a* and tongue *b* I cut a V-shaped notch, as indicated in Fig. 4, to allow the needle to pass through the cloth without touching the jaws or tongue, and prevent injuring the point of the needle or chafing the thread.

I make the needle-bar B, Figs. 1, 2, 3, 4, and 5, of iron or any other suitable material, substantially in the form indicated in Fig. 3; and in the lower end I cut a notch or slot of suitable shape to receive the needle at right angles to the bar. In the front side of this needle-bar, from the lower end upward, I cut a longitudinal slot or space, as indicated by dots at *h*, Fig. 2, of sufficient length to receive a lever, which is indicated by the same dots. This lever is sustained at the upper end by a joint-pin, and the lower end extends to the lower end of the needle-bar. Near the lower end of this lever, I cut a notch on an inclined plane, so that the lower point of this plane will pass under the needle (by the pressure of a spring, *i*, Figs. 1 and 2) and force it upward in the notch in the end of the needle-bar and hold it there until it is released by the operation of the machine.

The upper end of this needle-bar B is firmly attached to the front end of the shaft I by a screw, K, Figs. 1, 2, and 3, and the lower end receives a vibratory motion of several inches parallel to the front end of the machine, as indicated by the curved line *j*, Fig. 3. This motion is produced by a crank, L, Fig. 1, on the cam-shaft *m*. The pin *k* of this crank works in a slot in the lever M, Fig. 1, which slot is indicated by dots at *l*, Fig. 3. The upper end of this lever is firmly attached to the rear end of the shaft I, and its vibratory motion controls the vibratory motion of the needle-bar. When the pin *k* acts in the lower portion of the slot *l*, it has the greatest leverage, and the lever M has the least velocity; so that the needle-bar will be carried in its forward movement with greater force and less velocity than when the crank-pin *k* works in the upper portion of the slot to bring the needle-bar back for another stitch, and while the pin is passing into the curve at the lower end, the needle-bar is nearly stationary, it being the time when the needle is released from the notch.

I make the thimble-bar H of iron or any other suitable material, substantially in the form shown in Figs. 2 and 3, and at the lower end insert an adjusting-screw with a countersink in the end to receive the eye of the needle, as shown at *n*, Figs. 2 and 3. A little above the screw I insert a bar or blade, as seen at O in Figs. 2 and 3, and on the front side of this bar I have an inclined plane, as indicated at O, Fig. 2, and more fully shown in Fig. 8. When this bar O passes through the mortise in the needle-bar B, as shown in Fig. 3, the inclined plane forces back the notched lever and releases the needle after the point has entered the cloth.

The thimble-bar is attached near the front end of a vibrating bar, Q, above the shaft I, as shown at N, Figs. 1, 2, and 3. This vibrating bar Q extends the whole length of the shaft I, and vibrates with bearings on the ends of the shaft I, as seen at K and O, Fig. 1. This thimble-bar receives a vibratory motion, to force the needle through the cloth and to release the needle from the needle-bar, by the operation of the cam No. 3 on the lever P, Figs. 1 and 3, which has its bearing at O, and controls the forward motion of the thimble-bar, and the thimble-bar is thrown back to the position shown in Fig. 2 by the spring *p*, which keeps the lever P in contact with the cam.

To feed the cloth, I use a fluted roller, *q*, and a plain pressure-roller, *r*, as indicated in Figs. 1 and 2, in the well-known way of feeding, &c., used in spinning-machines, and in feeding cloth, &c., for various purposes. I work this fluted feed roller *q* by means of the cam No. 2 acting on the lever R, with a click or hand, *s*, working in the ratchet-wheel S, all as shown in Fig. 1.

This ratchet-wheel S is firmly secured on the rear end of the shaft T, Fig. 1, on the front end of which the fluted roller is secured, as shown at *q*, Figs. 1 and 2. The pressure-roller *r* is sustained by a bar, U, and the pressure given by a spring, *t*, Figs. 1 and 2. This feed may be adjusted by the screw near *s* to any desired length of stitch.

To draw the main part of the thread through the cloth, and to control the slack thread, I use four endless tapes working on pulleys, all as indicated at *u*, *v*, *w*, and *x*, in Fig. 2; also indicated in part in Figs. 1, 4, and 5.

These pulleys are revolved (in the directions indicated by the darts in Fig. 2) by a cross-band from the driving-pulley *v*, Fig. 2, and they carry the endless tapes in the directions indicated by the darts in Fig. 2, and the upper pulleys *u* are held down by springs *a'*, Figs. 2 and 4.

In connection with these endless tapes I have two hooks, *y z*, as shown in Fig. 4; their shape shown in plan in Fig. 9 and in cross-section at *y*, Fig. 2. The hook *y* is carried across the thread, so as to hook onto it, by the operation of the cam *b'*, Figs. 1 and 6, on the gear-wheel *x*, Figs. 1 and 2, acting on the lever *c'*, Figs. 1 and 2, through the medium of the bent rod *d'*, as shown in Fig. 1 and indicated in Figs. 2 and 4, and is thrown back by a spring, *e'*, acting against the lower end of the lever *c'*, Fig. 1.

The hook *z* is forced forward across the thread, so as to hook onto it, by a spring, *g'*, acting against the lower end of the lever Y, Fig. 1, which is connected with the rear end of the rod Z, Figs. 1 and 4, and it is carried back (and held back) by the operation of the cam A', Fig. 6, on the gear-wheel X, Figs. 1 and 2.

This gear-wheel X is revolved (in the direction indicated by the dart in Fig. 2) by means of a small wheel, B', Figs. 1 and 2, which is firmly secured to the cam-shaft *m*, and revolves with the driving-pulley V. This small wheel has but half as many teeth as the wheel X, so that the cam-wheel X makes but one revolution while the driving pulley V makes two.

Having constructed the several parts of the machine and arranged them as before described, I pass the cloth (in a suitable manner) into the cloth-holder, above the tongue *b* and below the jaws *a a*, and pass the thread through the eye of a common sewing-needle, (of suitable size for the thread,) and secure it there. I then bring the needle-bar B to the right-hand side of the cloth-holder to its full extent, place the eye of the needle in the countersunk end of the adjusting screw *n*, in the lower end of the thimble-bar, and put the barrel or shaft of the needle into the notch in the lower end of the needle-bar, (so that it will be sustained by the inclined notch of the lever,) when the machine is ready for operation, having the tapes, &c., in their places.

I then put the driving-pulley V in motion in the direction indicated by the dart, by means of a treadle or otherwise, when the cam No. 1, acting on the lever D, will carry up the tongue *b* and force the cloth upward and between the jaws *a a*, and the crank L, acting in the lower portion of the slot in the lever M, will carry the needle-bar forward, and the cam No. 3, acting on the lever P, will also carry the thimble-bar forward and force the point of the needle through the cloth, while the needle is guided by the needle-bar. While the crank L is operating in the curve of the groove near the lower end of the lever M, the thimble-bar will advance much faster than the needle-bar and pass the bar O through the mortise in the needle-bar, as seen in Fig 3, so that the inclined plane at O (Figs. 2 and 8) will force back the notched lever and release the needle from the needle-bar, which will then pass over the jaws, immediately after which the tongue *b* will be elevated so as to raise that portion of the needle which has been forced through the cloth by the forward movement of the thimble-bar into the notch in the lower end of the needle-bar, when the cam No. 3 will release the lever P, and the thimble-bar will be thrown back by the spring *p* and the inclined notch in the lower end of the lever. The needle-bar will firmly grasp the needle, and the needle-bar (in its continued forward movement) will carry the needle, with the thread, beyond the pulleys *u* and *v*. At this time the projection on the lever Y will fall into the space near A′, Fig. 6, on the rear side of the cam-wheel X, and the spring *g′*, Fig. 1, will force the hook *z* across and hook it onto the thread, when the cam A′, Fig. 6, acting on the lever Y, Fig. 1, will draw back the hook *z* to the position shown in Fig. 4, and thus carry the loop of thread to the central portion of the endless tapes, as at *h′*, Fig. 4, when the endless tapes will carry the thread onward until the whole is drawn through the cloth, when the rise of the cam at C′, Fig. 6, will draw the hook *z* still farther back and carry the thread beyond the edge of the endless tapes, as shown at *i′*, Fig. 4, while the other side of the loop (that attached to the needle) will be in the position shown at *j′*, Figs. 4 and 5, and a pin may be used, as shown near *j′*, to keep this portion of the loop more certainly out of the way of the needle while the thread is very long, but it is not very material. The ne dle-bar is then returned to its first position, the tongue *b* having descended to allow the needle-bar, with the needle, as shown in Figs. 2 and 4, to pass over the cloth in its backward movement, as also to allow the cloth to be fed, and preparatory to making a new bend in the cloth for the next stitch. At this time the cloth is fed by the fluted and pressure rollers, as before described, and all is ready for another stitch, as indicated in Fig. 5.

The next stitch is performed in precisely the same manner as the last, except that the hook *y* takes and carries the thread to the other pair of endless tapes, and the last loop is completely drawn up while the succeeding one is being carried away by the endless tapes. When the loop has been drawn up to about the position shown at A, Fig. 4, the hook, by means of the cam *k′* or the depression E′, will be carried toward the needle so as to release the loop, to allow it to be completely drawn up. Thus stitch after stitch will be taken.

I am aware that a rough surface, fluted roller or otherwise, has been used for feeding for ages in spinning-machines, and for feeding cloth and various other materials; that the common sewing-needle, with the eye at one end and the point at the other, is not new, and that cams, levers, &c., are old. I therefore do not claim either of these as my invention; but I do claim—

1. A work supporting or holding surface, adapted to bear on one side of the material being sewed, in combination with a reciprocating surface adapted to bear on the other side of such material, and which acts to bend such material, substantially as described, prior to the puncture of the needle, so that the needle-point may pass into and out of the material on the same side or face.

2. In combination with supporting and bending surfaces, operating substantially as described to present the material to the action of the needle, as set forth, a feeding surface, adapted to move the said material along at determined intervals, substantially as described.

3. In combination with a slotted supporting surface, the slot being transverse to the movement of the material, a reciprocating surface, adapted to press the material into such slot, and provided with a notch for the passage of the needle through the material folded or bent over it.

4. The combination of the cloth-holder with the needle-bar and thimble-bar, when constructed and made to operate substantially as herein described.

5. The combination of the needle-bar and thimble bar with a common needle, when made to operate substantially as herein described.

6. The combination of the needle-bar with the hooks and endless tapes, when arranged and made to operate substantially as herein described.

C. O. CROSBY.

Witnesses:
JOHN H. SHUMWAY,
A. J. TIBBITS.